United States Patent
Huppunen et al.

(10) Patent No.: US 8,727,075 B2
(45) Date of Patent: May 20, 2014

(54) ARRANGEMENT AND METHOD FOR SUPERVISING THE OPERATION OF A BRAKE

(75) Inventors: Jussi Huppunen, Vantaa (FI); Asmo Tenhunen, Hyvinkää (FI); Petri Alkula, Hämeenlinna (FI); Mika Olkkonen, Hyvinkää (FI); Tuukka Kauppinen, Hyvinkää (FI)

(73) Assignee: Kone Corporation, Helsinki (FI)

( * ) Notice: Subject to any disclaimer, the term of this patent is extended or adjusted under 35 U.S.C. 154(b) by 431 days.

(21) Appl. No.: 13/096,023

(22) Filed: Apr. 28, 2011

(65) Prior Publication Data

US 2011/0198167 A1 Aug. 18, 2011

Related U.S. Application Data

(63) Continuation of application No. PCT/FI2009/050876, filed on Oct. 30, 2009.

(30) Foreign Application Priority Data

Nov. 3, 2008 (FI) .................................... 20080604

(51) Int. Cl.
*B66B 1/32* (2006.01)
(52) U.S. Cl.
USPC .......................................... 187/288; 187/391
(58) Field of Classification Search
USPC ..................... 187/247, 288, 390, 391, 393; 188/1.11 R, 1.11 L, 1.11 E, 2 A, 137, 158
See application file for complete search history.

(56) References Cited

U.S. PATENT DOCUMENTS

| | | | | |
|---|---|---|---|---|
| 4,974,703 A * | 12/1990 | Nomura | .................... | 187/288 |
| 4,984,659 A | 1/1991 | Nomura | | |
| 4,987,977 A * | 1/1991 | Nomura | .................... | 187/288 |
| 5,153,389 A * | 10/1992 | Nomura | .................... | 187/288 |
| 6,401,875 B1 * | 6/2002 | Marvin et al. | .................... | 187/393 |
| 7,740,110 B2 * | 6/2010 | Kattainen et al. | .................... | 187/288 |
| 7,938,231 B2 * | 5/2011 | Ueda et al. | .................... | 187/288 |
| 8,205,721 B2 * | 6/2012 | Korhonen et al. | .................... | 187/288 |
| 8,235,180 B2 * | 8/2012 | Kattainen et al. | .................... | 187/288 |

FOREIGN PATENT DOCUMENTS

| | | | |
|---|---|---|---|
| DE | 10149604 | A1 | 4/2003 |
| EP | 1462673 | A1 | 9/2004 |
| GB | 2225679 | A | 6/1990 |
| GB | 2396672 | A | 6/2004 |
| JP | 2002/13567 | | 1/2002 |
| WO | 2009/024168 | A1 | 2/2009 |

* cited by examiner

*Primary Examiner* — Anthony Salata
(74) *Attorney, Agent, or Firm* — Birch, Stewart, Kolasch & Birch, LLP

(57) ABSTRACT

An arrangement and a method for supervising the operation of a brake includes a controllable electromechanical brake, including a magnetic circuit with at least two ferromagnetic parts fitted to move in relation to each other. A thrusting force is exerted between the ferromagnetic parts via a spring. The brake includes a magnetizing coil fitted into the magnetic circuit, for forming magnetic attraction between the parts of the brake. The arrangement includes a control of the brake, which includes at least one controllable switch, for adjusting the electricity supply of the magnetizing coil. The control of the brake comprises a supervision of the movement of the magnetic circuit of the brake.

15 Claims, 5 Drawing Sheets

ARRANGEMENT AND METHOD FOR SUPERVISING THE OPERATION OF A BRAKE

CROSS REFERENCE TO RELATED APPLICATIONS

Figure 1:
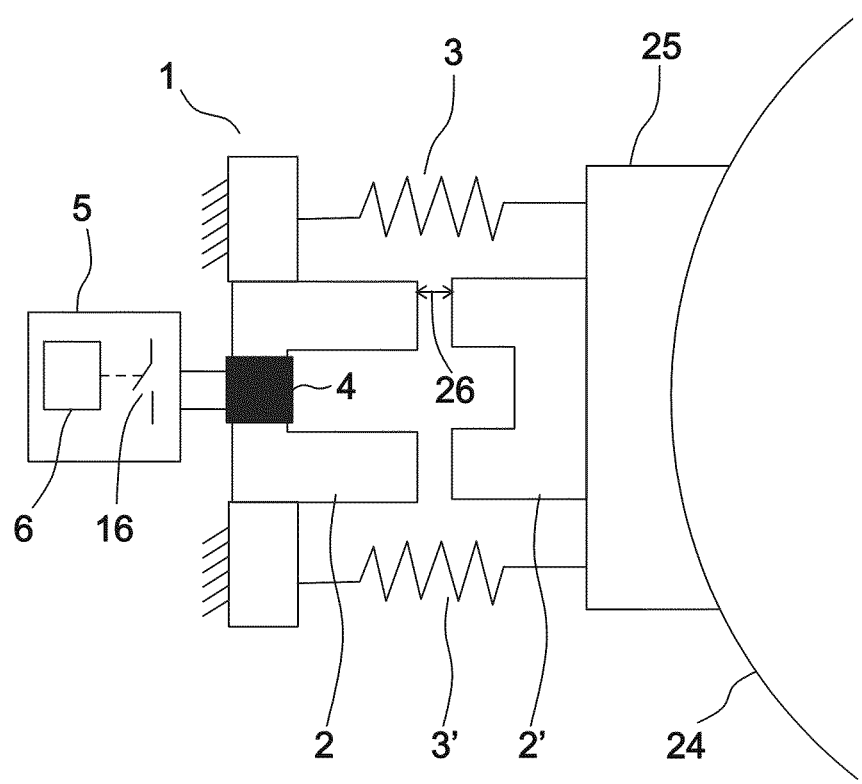

This application is a Continuation of PCT International Application No. PCT/FI2009/050876 filed on Oct. 30, 2009, which claims priority of Application No. 20080604 filed in Finland on Nov. 3, 2008, all of which are hereby expressly incorporated by reference into the present application.

The object of this invention is an arrangement for supervising the operation of a brake as defined in the preamble of claim 1, a method for supervising the operation of a brake as defined in the preamble of claim 6, and an elevator system as defined in the preamble of claim 8.

Electromechanical brakes are used e.g. in conveying systems to prevent movement of a motor or a conveying apparatus. Brakes often also function as safety devices, in which case their operation must be supervised.

For example, the safety regulations of an elevator system require supervision of the functioning of a brake. This supervision is conventionally performed with a mechanical switch, the switching state of which changes according to the movement of an active part of the brake. Mechanical switches are, however, unreliable; among other things, oxidation of the switch surfaces may prevent the creation of a contact. The movement of an active part of a brake is also generally very short, which makes adjustment of the operating range of a mechanical switch difficult.

The brake can also operate only partly if, for example, a foreign object enters the air gap of the magnetic circuit of the brake. In this case the brake does not necessarily open or close properly. Such an operating malfunction of a brake can cause an immediate hazard e.g. to passengers of a transport system. The functioning of a brake only partially is extremely difficult to detect with a mechanical switch.

Publication GB 2225679 A presents a brake control arrangement of an elevator, in which the operation of the brake is determined. According to the publication, the operation of the brake is determined from a change in the braking current at the time of the opening or of the closing of the brake.

The change in the braking current at the time of the opening or of the closing of the brake varies e.g. according to the speed of the movement of the magnetic circuit of the brake. As the movement of the brake decelerates, also the change in the brake current decreases. The magnitude of the change in the braking current is also affected by e.g. saturation of the magnetic circuit as well as by the impedance of an attenuation circuit possibly connected to the brake coil. When the change in the braking current decreases, the determination of the operation of the brake becomes more inaccurate. Also e.g. the operation of a current-regulated brake would in this case be difficult to supervise.

In order to overcome the problems presented above and to improve the accuracy and reliability of the supervision of the braking function, a new type of arrangement and method for supervising the operation of a brake is presented as an invention. An elevator system into which this type of brake supervision is fitted is also presented in the invention.

The arrangement according to the invention for supervising the operation of a brake is characterized by what is disclosed in the characterization part of claim 1. The method according to the invention for supervising the operation of a brake is characterized by what is disclosed in the characterization part of claim 6. The elevator system according to the invention is characterized by what is disclosed in the characterization part of claim 8. Other embodiments of the invention are characterized by what is disclosed in the other claims. Some inventive embodiments are also discussed in the descriptive section of the present application. The inventive content of the application can also be defined differently than in the claims presented below. The inventive content may also consist of several separate inventions, especially if the invention is considered in the light of expressions or implicit subtasks or from the point of view of advantages or categories of advantages achieved. In this case, some of the attributes contained in the claims below may be superfluous from the point of view of separate inventive concepts.

The arrangement according to the invention for supervising the operation of a brake comprises a controllable electromechanical brake, comprising a magnetic circuit, which comprises at least two ferromagnetic parts fitted to move in relation to each other, between which ferromagnetic parts a thrusting force is exerted via a spring or corresponding, and which brake comprises a magnetizing coil fitted into the magnetic circuit, for forming magnetic attraction between the aforementioned parts of the magnetic circuit of the brake, and which arrangement comprises a control of the brake, which comprises at least one controllable switch, for adjusting the electricity supply of the magnetizing coil. The aforementioned control of the brake comprises a supervision of the movement of the magnetic circuit of the brake, which supervision of movement is fitted: to supply an electrical excitation signal to the magnetizing coil; to determine the electrical response signal corresponding to the aforementioned electrical excitation signal; to determine the inductance of the magnetic circuit of the brake from the aforementioned electrical excitation signal and electrical response signal; to determine the opening of the brake, when the inductance of the magnetic circuit of the brake increases within a defined time from an opening procedure of the brake at least to the extent of the minimum change in inductance required at that time; to determine the closing of the brake, when the inductance of the magnetic circuit of the brake decreases within a defined time from a closing procedure of the brake at least to the extent of the minimum change in inductance required at that time; and also to determine an operating malfunction of the brake if the change in the inductance of the magnetic circuit of the brake remains after a brake control procedure smaller at least for a defined period of time than the minimum change in inductance required at that time. In the invention ferromagnetic part refers to a part that conducts magnetic flux. This type of part comprises ferromagnetic material, the relative permeability of which is considerably greater than one. The aforementioned ferromagnetic part can be manufactured e.g. from dynamo plate.

In the method according to the invention for supervising the operation of a brake: at least two ferromagnetic parts are fitted into the magnetic circuit of the brake; a thrusting force is exerted between the ferromagnetic parts by means of a spring or corresponding; a magnetizing coil is fitted into the magnetic circuit of the brake; a brake control is fitted in connection with the magnetizing coil; the electricity supply of the magnetizing coil is adjusted with the control of the brake; an electrical excitation signal is supplied to the magnetizing coil; the electrical response signal corresponding to the electrical excitation signal is determined; the inductance of the magnetic circuit of the brake is determined from the aforementioned electrical excitation signal and electrical response signal; the opening of the brake is determined, when the inductance of the magnetic circuit of the brake increases within a defined time from an opening procedure of the brake at least to the extent of the minimum change in inductance required at that time; the closing of the brake is determined, when the inductance of the magnetic circuit of the brake decreases within a defined time from a closing procedure of the brake at least to the extent of the minimum change in inductance required at that time; and also an operating malfunction of the brake is determined if the change in the inductance of the magnetic circuit of the brake remains after a brake control procedure at least for a defined period of time smaller than the minimum change in inductance required at that time.

The elevator system according to the invention comprises an elevator control. The elevator system also comprises an arrangement for supervising the operation of a brake of the elevator, which arrangement comprises a controllable electromechanical brake of the elevator, which brake comprises a magnetic circuit, which comprises at least two ferromagnetic parts fitted to move in relation to each other, between which ferromagnetic parts a thrusting force is exerted via a spring or corresponding, and which brake comprises a magnetizing coil fitted into the magnetic circuit, for forming magnetic attraction between the aforementioned ferromagnetic parts of the brake, and which arrangement comprises a control of the brake, which comprises at least one controllable switch, for adjusting the electricity supply of the magnetizing coil. The aforementioned control of the brake comprises a supervision of the movement of the magnetic circuit of the brake, which supervision of movement is fitted: to supply an electrical excitation signal to the magnetizing coil; to determine the electrical response signal corresponding to the aforementioned electrical excitation signal; to determine the inductance of the magnetic circuit of the brake from the aforementioned electrical excitation signal and electrical response signal; to determine the opening of the brake, when the inductance of the magnetic circuit of the brake increases within a defined time from an opening procedure of the brake at least to the extent of the minimum change in inductance required at that time; to determine the closing of the brake, when the inductance of the magnetic circuit of the brake decreases within a defined time from a closing procedure of the brake at least to the extent of the minimum change in inductance required at that time; to determine an operating malfunction of the brake if the change in the inductance of the magnetic circuit of the brake remains after a brake control procedure at least for a defined period of time smaller than the minimum change in inductance required at that time; and also to send to the control of the elevator information about a determined closing, opening and/or operating malfunction of the brake.

The brake according to the invention can be e.g. a drum brake or a disc brake.

The electromechanical brake of an elevator according to the invention can be e.g. a machinery brake that can be connected mechanically between some moving and some stationary part of the elevator machine, or a prong-like guide rail brake that grips a guide rail of the elevator car.

The elevator machine according to the invention can be disposed e.g. in the elevator hoistway, in the machine room, or, for instance, in connection with the elevator car.

In one embodiment of the invention two controllable machinery brakes that brake the elevator machine are fitted to the elevator machine.

In one embodiment of the invention a solid-state control unit is fitted to the elevator system, which control unit is fitted to read the safety sensors of the elevator system and to control the brake on the basis of the information read from the safety sensors. The aforementioned safety sensors of the elevator system are e.g. the safety switches of the landing doors, the end limit switches of the elevator hoistway, and also the safety switch of the overspeed governor. The solid-state control unit can be arranged to be redundant, in which case the control is duplicated e.g. with two microcontrollers that monitor the operating status of each other. A supervision of the movement of the magnetic circuit of a brake according to the invention can also be fitted in connection with an electronic control unit, and the electronic control unit can be fitted to prevent movement of the elevator car if the supervision of the movement of the magnetic circuit of the brake has determined an operating malfunction of the brake.

In one embodiment of the invention at least one controllable switch of the control of the brake is fitted in connection with the safety circuit of the elevator.

The controllable switches according to the invention can be mechanical switches, e.g. relays and contactors, and they can also be solid-state switches, e.g. IGBT transistors, MOSFET transistors, thyristors and bipolar transistors.

In the invention control pole refers to the input of the control signal of a controllable switch. This type of control pole is e.g. the coil of a relay or of a contactor, or e.g. the gate of a thyristor, IGBT transistor or MOSFET transistor, or the base of a bipolar transistor.

The elevator machine according to the invention comprises an elevator motor and a traction sheave fitted in connection with this.

In one embodiment of the invention the supervision of the movement of the magnetic circuit of the brake is fitted to supply a voltage signal to the magnetizing coil, to determine the current signal produced in the magnetizing coil by the aforementioned voltage signal and also to determine the inductance of the magnetic circuit of the brake from the aforementioned voltage signal and current signal.

In one embodiment of the invention the supervision of the movement of the magnetic circuit of the brake is fitted to supply a current signal to the magnetizing coil, and also to determine the voltage signal produced in the magnetizing coil by the aforementioned current signal.

In one embodiment of the invention the supervision of the movement of the magnetic circuit is fitted to supply an electrical alternating electricity excitation signal, in addition to a brake control signal, to the magnetizing coil, to determine the electrical alternating electricity response signal corresponding to the aforementioned electrical alternating electricity excitation signal, and also to determine the inductance of the magnetic circuit of the brake from the aforementioned electrical alternating electricity excitation signal and electrical alternating electricity response signal.

In one embodiment of the invention the supervision of the movement of the magnetic circuit is fitted to determine the time when the two aforementioned ferromagnetic parts start to move in relation to each other from the change in inductance of the magnetic circuit, to determine the magnitude of the thrusting force between the ferromagnetic parts of the brake from the current signal of the magnetizing coil, which current signal is determined at the time when the aforementioned two ferromagnetic parts start to move in relation to each other, and also to determine the operating condition of the brake on the basis of the thrusting force between the aforementioned ferromagnetic parts.

In one embodiment of the invention the supervision of the movement of the magnetic circuit is fitted to control the aforementioned at least one controllable switch at a set switching frequency, for adjusting the current of the magnetizing coil; and also to determine the inductance of the magnetic circuit of the brake on the basis of a variation in the aforementioned switching frequency of the current of the magnetizing coil.

In one embodiment of the invention the electricity supply to the magnetizing coil is arranged from a direct-voltage output via an electricity supply circuit; an attenuation circuit is connected in a manner that conducts electricity in parallel with the magnetizing coil, the impedance of which attenuation circuit is determined; the electricity supply circuit is fitted to be disconnected as a closing procedure of the brake; and when the electricity supply circuit is disconnected the current of the magnetizing coil is fitted to commutate to the attenuation circuit; and the supervision of the movement of the magnetic circuit of the brake is in this case fitted to determine the inductance of the magnetic circuit of the brake from a change in the current signal of the magnetizing coil and also from the magnitude of the voltage of the direct-voltage output, using in the determination information about the impedance of the aforementioned attenuation circuit.

In one embodiment of the invention an air gap is arranged between the first and the second ferromagnetic parts of the brake that move in relation to each other, also in a situation in which the brake is controlled open, for reducing the remanence effect of the magnetic circuit. In one embodiment of the invention the ferromagnetic part fitted into the magnetic circuit of the brake is of E-core shape.

With the invention at least one of the following advantages, among others, is achieved:

When, according to the invention, an electrical response signal, e.g. a current signal, corresponding to an electrical excitation signal, e.g. a voltage signal, is determined, and the inductance of the brake is further determined from the electrical excitation signal and electrical response signal, the inductance, and via this the change in inductance, can be determined for the reference period, the length of which is determined according to the brake control procedure to be performed. The length of the reference period can, it necessary, be set separately for both an opening event and for a closing event of the brake. In this case the speed of the movement of the magnetic circuit does not affect the determination of the movement of the magnetic circuit in the same way as in determination of the movement of the magnetic circuit directly from the current of the magnetizing coil according to prior art.

If in addition to a brake control signal, such as a brake opening signal or a brake closing signal, an electrical alternating electricity excitation signal, e.g. an alternating voltage signal, is supplied to the magnetizing coil of the brake, the inductance of the magnetic circuit of the brake can be determined from the aforementioned alternating electricity excitation signal as well as from the alternating electricity response signal, such as the alternating current signal, corresponding to the alternating electricity excitation signal. In this case the inductance of the brake can be determined separately both before movement of the magnetic circuit of the brake and after movement of the magnetic circuit. Thus the change in inductance that is caused by the aforementioned movement of the magnetic circuit of the brake can also be determined in a controlled manner. This type of determination of the change in inductance increases the accuracy of the determination of movement of the magnetic circuit and at the same time improves the efficiency of the supervision of the movement of the magnetic circuit.

In one embodiment of the invention the time when the two ferromagnetic parts of the electromechanical brake start to move in relation to each other is determined from the change in inductance of the magnetic circuit. In this case the magnitude of the thrusting force between the ferromagnetic parts of the magnetic circuit of the brake at the aforementioned time can be determined from the current signal of the magnetizing coil, because the magnitude of the current signal is proportional to the magnitude of the force of attraction corresponding to the thrusting force. Furthermore, the operating condition of the brake can be determined on the basis of the thrusting force between the ferromagnetic parts, because the braking force also decreases as the thrusting force diminishes.

Figure 2A:
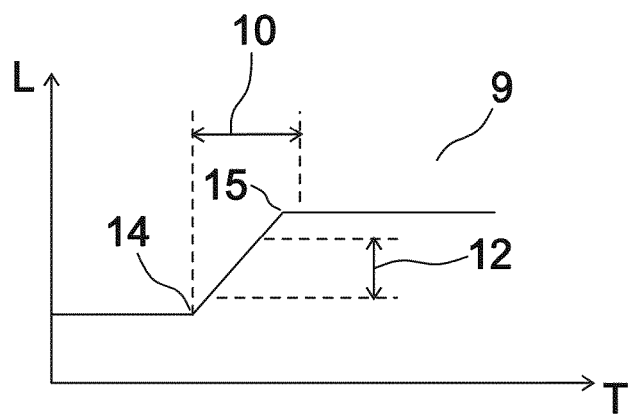
Figure 2B:
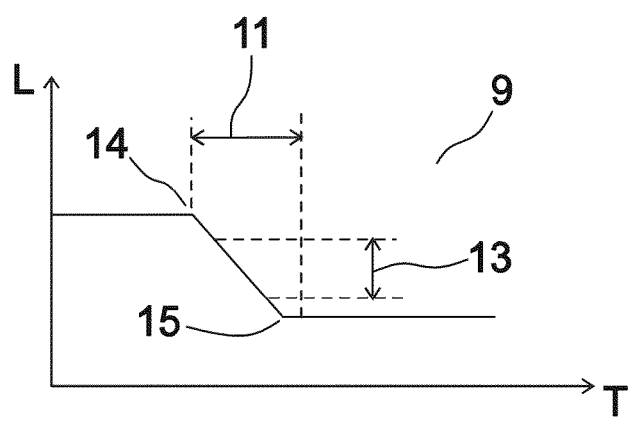
Figure 2C:
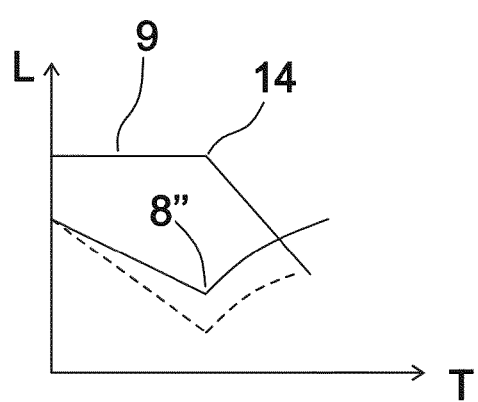
Figure 3:
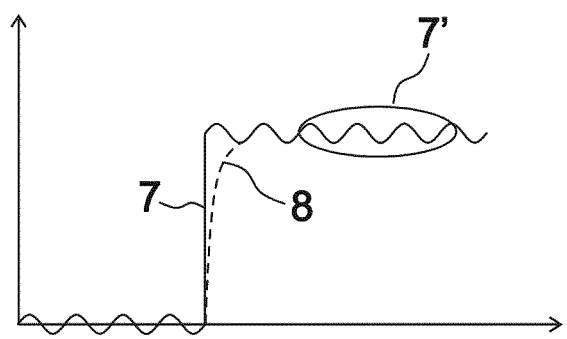
Figure 3:
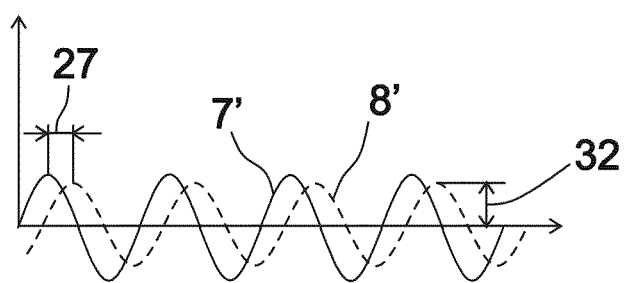
Figure 4A:
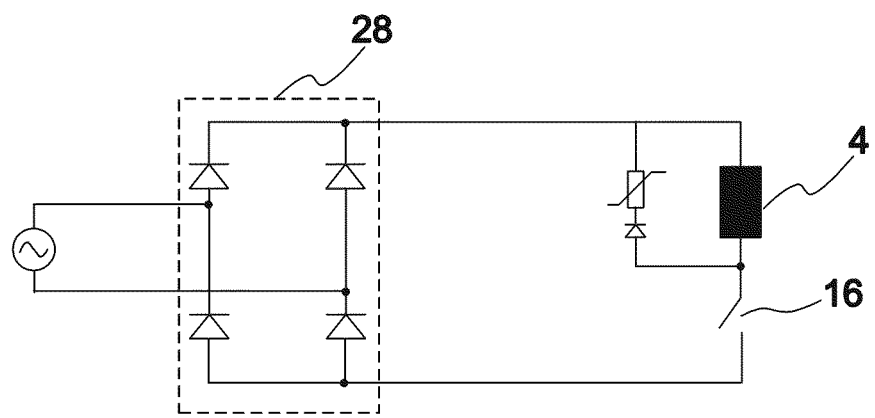
Figure 4B:
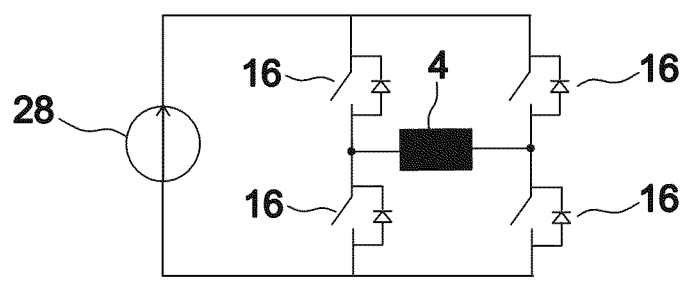
Figure 5A:
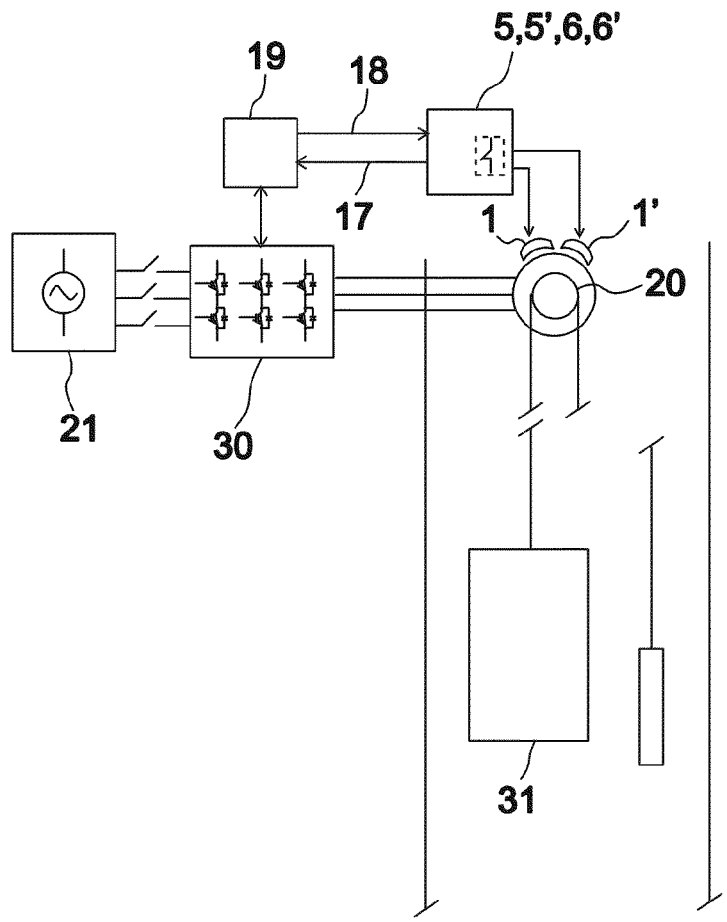
Figure 5B:
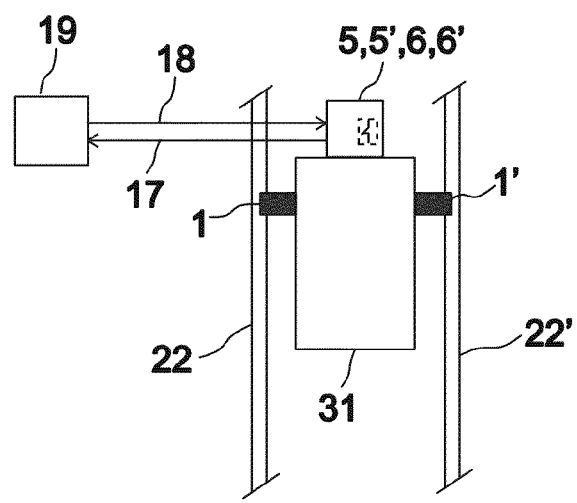

In the following, the invention will be described in more detail by the aid of some examples of its embodiments, which in themselves do not limit the scope of application of the invention, with reference to the attached drawings, wherein FIG. 1 presents by way of example the formation of a force in connection with the magnetic circuit of an electromechanical brake according to the invention, FIG. 2a presents the variation of inductance produced by an opening procedure of the brake in the magnetic circuit of an electromechanical brake according to the invention, FIG. 2b presents the variation of inductance produced by a closing procedure of the brake in the magnetic circuit of an electromechanical brake according to the invention, FIG. 2c presents the inductance of the magnetic circuit as well as the current of the magnetizing coil of the brake in connection with a closing procedure of the brake, FIG. 3 presents the current and voltage of the magnetizing coil in connection with an opening procedure of a brake according to the invention, FIG. 4a presents a control of a brake according to the invention, FIG. 4b presents a second control of a brake according to the invention, FIG. 5a presents one elevator system according to the invention, FIG. 5b presents a second elevator system according to the invention.

FIG. 1 presents one brake control arrangement according to the invention by way of example. The arrangement comprises a controllable electromechanical brake 1, comprising a magnetic circuit, which comprises at least two ferromagnetic parts 2,2' of an iron core fitted to move in relation to each other. Of the parts, the first 2 is fixed to the stationary part (not in figure) of the electric motor, and the second 2' part is attached to the brake pad 25, which is fitted to connect to the braking surface 24. In this case a thrusting force is exerted between the ferromagnetic parts 2,2' via two helical springs 3, 3', which thrusting force presses the brake pad 25 against the braking surface 24. A magnetizing coil 4 is wound around the first part 2 of the iron core of the magnetic circuit of the brake 1. The current supply to the magnetizing coil 4 produces a force of attraction between the ferromagnetic parts 2,2', in which case when the current and at the same time the force of attraction progressively increase the second part 2' of the magnetic circuit finally starts to move towards the first part 2, pulling at the same time the brake pad 25 away from the braking surface 24. The air gap 26 of the magnetic circuit between the first 2 and the second 2' part starts to decrease, and finally goes to zero when the magnetic circuit closes. At the same time the brake opens, and the rotor can rotate. Correspondingly, when the current of the magnetizing coil progressively decreases the second part 2' of the magnetic circuit finally starts to move away from the first part 2, pressing at the same time the brake pad 25 against the braking surface 24. In this case the brake engages to prevent movement of the rotor.

The arrangement according to FIG. 1 also comprises a control 5 of the brake, which comprises a controllable switch 16, e.g. a relay, a MOSFET transistor, and/or an IGBT transistor, for adjusting the electricity supply of the magnetizing coil 4. A supervision 6 of the movement of the magnetic circuit is fitted in connection with the control pole of the controllable switch 16. The supervision 6 of movement is fitted to connect the direct-voltage signal 7 to the magnetizing coil 4 via the controllable switch 16 as a brake opening procedure. The supervision 6 of movement is also fitted to disconnect the direct-voltage signal 7 of the magnetizing coil 4 as a brake closing procedure. The supervision 6 of movement measures the current signal 8 corresponding to the connected direct-voltage signal 7, and also the current signal 8 after the direct-voltage signal is disconnected, and determines the inductance 9 of the magnetic circuit of the brake on the basis of direct-voltage signal 7, and also on the basis of the change in the current signal 8 of the magnetizing coil 4. When the second part 2' of the magnetic circuit stays in its position, the inductance 9 of the magnetic circuit can be roughly determined e.g. on the basis of the direct-voltage signal (U) 7, and on the basis of the change ($\Delta I$) in the magnetizing current occurring in the time interval ($\Delta t$) from the equation (1):

$$L = \frac{U * \Delta t}{\Delta I} \quad (1)$$

When the second part 2' of the magnetic circuit moves and the air gap 26 of the magnetic circuit in this case changes, the separate voltage component ($U_A$) that is induced in the magnetizing coil owing to the change ($\Delta L$) in inductance caused by the change of the air gap 26 of the magnetic circuit in the time interval ($\Delta t$) must, together with the direct-voltage signal 7, be taken into account in the determination of the inductance 9.

$$U_\Delta = \frac{I * \Delta L}{\Delta t} \quad (2)$$

FIGS. 2a and 2b present as an example the variation caused in the inductance 9 of the magnetic circuit by the brake control procedures described in the embodiment of FIG. 1. In FIG. 2a at the time 14 the current of the magnetizing coil has increased to a value at which the force of attraction between the parts of the magnetic circuit produced by the current overcomes the thrusting force between the parts, and the air gap 26 of the magnetic circuit starts to decrease. In this case the aforementioned force of attraction pulls the brake pad 25 away from the braking surface 24, and the brake opens. As the air gap decreases, the inductance 9 starts to increase. At the time 15 the magnetic circuit has closed, and the inductance has reached its maximum value. The supervision 6 of the movement of the magnetic circuit of the brake determines the opening of the brake, when the inductance 9 of the magnetic circuit of the brake increases within the set time 10 marked in FIG. 2a from an opening procedure of the brake at least to the extent of the minimum change 12 in inductance required in connection with an opening of the brake.

In FIG. 2b at the time 14 the current of the magnetizing coil has decreased to a value at which the force of attraction between the parts of the magnetic circuit produced by the current falls below the thrusting force between the parts, and the air gap 26 of the magnetic circuit starts to increase. In this case the thrusting force between the parts of the magnetic circuit presses the brake pad 25 against the braking surface 24, and the brake closes. As the air gap increases, the inductance 9 starts to decrease. At the time 15 the magnetic circuit has opened completely. The supervision 6 of the movement of the magnetic circuit of the brake determines the closing of the brake, when the inductance 9 of the magnetic circuit of the brake decreases within the set time 11 marked in FIG. 2b from a closing procedure of the brake at least to the extent of the minimum change 13 in inductance required in connection with a closing of the brake.

The supervision 6 of the movement of the magnetic circuit determines an operating malfunction of the brake if the change in the inductance 9 remains after a brake control procedure at least for a defined period of time 10, 11 smaller than the minimum change 12, 13 in inductance required at that time.

FIG. 2c presents the inductance 9 of the magnetic circuit of the brake as well as the current 8, 8" of the magnetizing coil in connection with a closing procedure of the brake. At the time 14 the current of the magnetizing coil has decreased to a value at which the force of attraction between the parts of the magnetic circuit produced by the current has fallen below the thrusting force between the parts, and the air gap 26 of the magnetic circuit starts to increase. The supervision of the movement of the magnetic circuit measures the change in the current 8 of the magnetizing coil at set intervals, records the measured values of the current and the measurement times of the values in the memory, and determines the values of the inductance 9 of the magnetic circuit corresponding to the measured values of current. Furthermore, the supervision of movement determines from the aforementioned values of inductance 9, e.g. by interpolation or by comparing ranges, the time 14 when the determined inductance starts to essentially decrease. After this the supervision of movement selects the value 8" of the current that corresponds to the aforementioned time 14. Because the thrusting force between the ferromagnetic parts of the brake is proportional at the time 14 to the determined current 8" of the magnetizing coil, the supervision of movement compares this value 8" of current to the smaller limit value of permitted current, and determines the operating condition of the brake on the basis of the aforementioned comparison. If the value of the current falls below the permitted limit value, the supervision of movement deduces that the brake has become defective.

In the embodiment of the invention presented in FIG. 3 the supervision of the movement of the magnetic circuit supplies a separate alternating voltage excitation signal 7', in addition to a brake opening signal 7, to the magnetizing coil 4 of the brake, which is summed to the voltage of the brake opening signal 7. Correspondingly, two separate current signals can be distinguished in the current of the magnetizing coil, the current signal 8 corresponding to the brake opening signal, and also the alternating current response signal 8' that corresponds to the alternating voltage excitation signal 7' and that is summed to the current signal 8. The lower graph of FIG. 3 presents the aforementioned alternating voltage excitation signal 7' and the aforementioned alternating current response signal 8' separated from the direct-electricity signals. The inductance of the magnetic circuit of the brake can in this case be determined from the amplitude 32 of the alternating current response signal 8' as well as in some cases also from the phase difference 27 between the alternating voltage excitation signal 7' and the alternating current response signal 8'. The controllable brake can be e.g. of the type described in the embodiment of FIG. 1.

FIGS. 4a and 4b present two embodiments for a control of a brake according to the invention.

The control of the brake according to FIG. 4a comprises a controllable relay 16, via which the magnetizing coil 4 is connected to a rectified voltage supply 28, in which case current starts to flow in the magnetizing coil, and the brake opens. Correspondingly when the relay 16 is opened, the magnetizing coil disconnects from the voltage supply 28, and the current of the coil 4 commutates to the attenuation circuit connected in parallel with the coil, in which case the current starts to decrease the inductance and the internal resistance of the coil, as well as the impedance of the attenuation circuit, with the set time constant.

The control of the brake according to FIG. 4b comprises four controllable switches, such as IGBT or MOSFET transistors, which are arranged into an H-bridge. Antiparallel-connected diodes are fitted in parallel with the controllable switches. The magnetizing coil 4 of the brake is connected to the outputs of the change-over switches of the H-bridge according to FIG. 4b. Likewise the switches of the change-over switch are controlled in turns to conduct with PWM modulation (pulse width modulation), for adjusting the voltage between the poles of the magnetizing coil 4. In this embodiment of the invention the current of the magnetizing coil is measured, and the current is regulated with a current regulator, according to a pre-selected current profile.

FIG. 5a presents an elevator system according to the invention, into which an arrangement for supervising the operation of a brake is fitted. The elevator car 31 and the counterweight are supported with elevator ropes passing via the traction sheave 20 of the elevator motor in a manner that is, in itself, prior art. The power supply of the elevator motor that moves the elevator car occurs from the electricity network 21 with a frequency converter 30. The control 19 of the elevator adjusts the movement of the elevator car in response to the elevator calls received.

Two electromechanical brakes 1, 1', which both connect to the braking surface of the traction sheave 20 to prevent movement of the traction sheave, are fitted in connection with the traction sheave of the elevator machine. Both brakes can be of the same type as some of the embodiments described earlier. A control 5, 5', of the brake is fitted in connection with the magnetizing coils 4, 4' of both brakes 1, 1', which control comprises a supervision 6, 6' of the movement of the magnetic circuit of the brake. The supervision 6, 6' of the movement of the magnetic circuit is fitted to supply a voltage signal 7, 7' to the magnetizing coil 4, 4', and also to determine the current signal 8, 8' corresponding to the aforementioned voltage signal. Furthermore, both of the supervisions 6, 6' of movement are fitted to determine the inductance 9 of the magnetic circuit of the brake, and also to determine the opening, closing and/or an operating malfunction of the brake, such as is described elsewhere in a preceding embodiment. In addition, a communications channel is made between the controls 5, 5' of the brake and the control 19 of the elevator, via which both the supervisions 6, 6' of the movement of the magnetic circuit sends to the control 19 of the elevator information 17 about a determined closing, opening and/or an operating malfunction of the brake.

In one embodiment of the invention both of the supervisions 6, 6' of the movement of the magnetic circuit are additionally fitted to determine from the change in inductance 9 of the magnetic circuit at the moment in time 14, when the two ferromagnetic parts 2,2' of the magnetic circuit of the brake start to move in relation to each other. The thrusting force between the ferromagnetic parts of the brake and further the operating condition of the brake can in this case be determined with the same method as in one of the embodiments described earlier. In this case both the supervisions 6, 6' of the movement of the magnetic circuit also send to the control of the elevator information 17 about a the operating condition of the brake determined by it via a communications channel between the control of the elevator and the control of the brake.

In one embodiment of the invention the control 19 of the elevator sends a brake opening command or a brake closing command 18 to the control 5, 5' of the brake via the aforementioned communications channel.

FIG. 5b presents a second elevator system according to the invention, into which an arrangement for supervising the operation of a brake is fitted.

Two electromechanical prong-like guide rail brakes 1, 1', which connect to the guide rail 22, 22' of the elevator car in the elevator hoistway to prevent movement of the elevator car, are fitted in connection with the elevator car. The jaws of the brake are hinged to each other. The spring loads the jaws, pressing the jaws farther apart from each other, in which case the brake pads compress against the guide rail, because the jaws are hinged between the brake pads and the spring by means of bolts so that the jaws cannot move apart from each other at the location of the bolts. The guide rail brake is opened and held open by means of the magnetizing coil.

The current supply to the magnetizing coil 4, 4' produces a force of attraction between the ferromagnetic parts 2,2' of the guide rail brake, in which case when the current and at the same time the force of attraction progressively increase the second part 2' of the magnetic circuit finally starts to move towards the first part 2, pulling the jaws closer to each other, in which case the brake opens.

A control 5, 5', of the brake is fitted in connection with the magnetizing coils 4, 4' of both brakes 1, 1', which control comprises a supervision 6, 6' of the movement of the magnetic circuit of the brake. Both the supervisions 6, 6' of movement are fitted to supply a voltage signal 7, 7' to the corresponding magnetizing coil 4, 4', and also to determine the current signal 8, 8' corresponding to the aforementioned voltage signal. Furthermore, both the supervisions 6, 6' of movement are fitted to determine the inductance 9 of the magnetic circuit of the corresponding brake, and also to determine the opening, closing and/or an operating malfunction of the brake, such as is described elsewhere in a preceding embodiment. In addition, a communications channel is made between the controls 5, 5' of the brake and the control of the elevator, via which the supervision 6, 6' of the movement of both magnetic circuits sends to the control 19 of the elevator information 17 about a determined closing, opening and/or operating malfunction of the brake.

In one embodiment of the invention both of the supervisions 6, 6' of the movement of the magnetic circuit are additionally fitted to determine from the change in inductance 9 of the magnetic circuit at the time 14, when the two ferromagnetic parts 2,2' of the magnetic circuit of the guide rail brake start to move in relation to each other. Additionally, the thrusting force between the ferromagnetic parts of the brake and further the operating condition of the brake can in this case be determined with the same method as in one of the embodiments described earlier. In this case both the supervisions 6, 6' of the movement of the magnetic circuit also send to the control of the elevator information 17 about the operating condition of the brake determined by it via a communications channel between the control of the elevator and the control of the brake.

In one embodiment of the invention the control 19 of the elevator sends a brake opening command or a brake closing command 18 to the control 5, 5' of the brake via the aforementioned communications channel.

It is obvious to the person skilled in the art that different embodiments of the invention are not limited to the example described above, but that they may be varied within the scope of the claims presented below.

The magnetic circuit of a brake presented in FIG. 1 is only an example; it is obvious to the person skilled in the art that the effect according to the invention can be achieved with different geometries of the magnetic circuit.

The thrusting force between the ferromagnetic pieces in the magnetic circuit of the brake can be produced in many different ways. In addition to a helical spring, the force effect can be achieved e.g. with a spring set, with a gas spring, or with a hydraulic means. In this case the number of components that produce the force effect can also differ.

The invention claimed is:

1. Arrangement for supervising the operation of a brake, which arrangement comprises a controllable electromechanical brake, comprising a magnetic circuit, which comprises at least two ferromagnetic parts fitted to move in relation to each other,
    between which ferromagnetic parts a thrusting force is exerted via a spring or corresponding
    and which brake comprises a magnetizing coil fitted into the magnetic circuit, for forming magnetic attraction between the aforementioned parts of the brake,
    and which arrangement comprises a control of the brake, which comprises at least one controllable switch, for adjusting the electricity supply of the magnetizing coil,
    wherein the aforementioned control of the brake comprises a supervision of the movement of the magnetic circuit of the brake, which supervision of movement is fitted:
        to supply an electrical excitation signal to the magnetizing coil;
        to determine the electrical response signal corresponding to the aforementioned electrical excitation signal;
        to determine the inductance of the magnetic circuit of the brake from the aforementioned electrical excitation signal and electrical response signal;
        to determine the opening of the brake, when the inductance of the magnetic circuit of the brake increases within a defined time from an opening procedure of the brake at least to the extent of the minimum change in inductance required at that time, time;
        to determine the closing of the brake, when the inductance of the magnetic circuit of the brake decreases within a defined time from a closing procedure of the brake at least to the extent of the minimum change in inductance required at that time; and
        to determine an operating malfunction of the brake if the change in the inductance of the magnetic circuit of the brake remains after a brake control procedure at least for a defined period of time smaller than the minimum change in inductance required at that time.

2. Arrangement according to claim 1, wherein the supervision of the movement of the magnetic circuit is fitted:
    to supply a voltage signal to the magnetizing coil, and also to determine the current signal caused in the magnetizing coil by the aforementioned voltage signal; and
    to determine the inductance of the magnetic circuit of the brake from the aforementioned voltage signal and aforementioned current signal.

3. Arrangement according to claim 1, wherein the supervision of the movement of the magnetic circuit is fitted:
    to supply an electrical alternating electricity excitation signal excitation signal, in addition to a brake control signal, to the magnetizing coil;
    to determine the electrical alternating electricity response signal corresponding to the aforementioned electrical alternating electricity excitation signal; and
    to determine the inductance of the magnetic circuit of the brake from the aforementioned electrical alternating electricity excitation signal and electrical alternating electricity response signal.

4. Arrangement according to claim 1, wherein the supervision of the movement of the magnetic circuit is fitted:
    to determine from the change in the inductance of the magnetic circuit the moment in time when the aforementioned two ferromagnetic parts start to move in relation to each other;
    to determine the magnitude of the thrusting force between the ferromagnetic parts of the brake from the current signal of the magnetizing coil, which current signal is determined at the time when the aforementioned two ferromagnetic parts start to move in relation to each other; and
    to determine the operating condition of the brake on the basis of the thrusting force between the aforementioned ferromagnetic parts.

5. Arrangement according to claim 1, claims, characterized in that wherein the supervision of the movement of the magnetic circuit is fitted to form at least one supervision signal, on the basis of the determined operating condition of the brake.

6. Method for supervising the operation of a brake, in which method:
    at least two ferromagnetic parts are fitted into the magnetic circuit of the brake;
    a thrusting force is exerted between the ferromagnetic parts via a spring or corresponding
    a magnetizing coil is fitted into the magnetic circuit of the brake;
    a control of the brake is fitted in connection with the magnetizing coil;
    the electricity supply of the magnetizing coil is adjusted with the control of the brake;
    an electrical excitation signal is supplied to the magnetizing coil;
    the electrical response signal corresponding to the electrical excitation signal is determined;
    the inductance of the magnetic circuit of the brake is determined from the aforementioned electrical excitation signal and aforementioned electrical response signal;
    the opening of the brake is determined, when the inductance of the magnetic circuit of the brake increases within a defined time from the opening procedure of the brake at least to the extent of the minimum change in inductance required at that time;
    the closing of the brake is determined, when the inductance of the magnetic circuit of the brake decreases within a defined time from the closing procedure of the brake at least to the extent of the minimum change in inductance required at that time; and
    an operating malfunction of the brake is determined if the change in the inductance of the magnetic circuit of the brake remains after a brake control procedure at least for a defined period of time smaller than the minimum change in inductance required at that time.

7. Method according to claim 6, wherein:
    the time when the aforementioned two ferromagnetic parts start to move in relation to each other is determined from the change in the inductance of the magnetic circuit;
    the current signal of the magnetizing coil is determined at the aforementioned time when the two ferromagnetic parts start to move in relation to each other;
    the magnitude of the thrusting force between the ferromagnetic parts of the brake is determined from the determined current signal of the magnetizing coil; and the operating condition of the brake is determined on the basis of the thrusting force between the ferromagnetic parts.

8. Elevator system, which comprises a control of the elevator and which elevator system also comprises an arrangement for supervising the operation of a brake of the elevator, which arrangement comprises a controllable electromechanical brake of the elevator, comprising a magnetic circuit, which comprises at least two ferromagnetic parts fitted to move in relation to each other, between which ferromagnetic parts a thrusting force is exerted via a spring or corresponding and which brake comprises a magnetizing coil fitted into the magnetic circuit, for forming magnetic attraction between the aforementioned ferromagnetic parts of the brake, and which arrangement comprises a control of the brake, which comprises at least one controllable switch, for adjusting the electricity supply of the magnetizing coil, wherein the aforementioned control of the brake comprises a supervision of the movement of the magnetic circuit of the brake, which supervision of movement is fitted:
   to supply an electrical excitation signal to the magnetizing coil;
   to determine the electrical response signal corresponding to the aforementioned electrical excitation signal;
   to determine the inductance of the magnetic circuit of the brake from the aforementioned electrical excitation signal and aforementioned electrical response signal;
   to determine the opening of the brake, when the inductance of the magnetic circuit of the brake increases within a defined time from an opening procedure of the brake at least to the extent of the minimum change in inductance required at that time
   to determine the closing of the brake, when the inductance of the magnetic circuit of the brake decreases within a defined time from a closing procedure of the brake at least to the extent of the minimum change in inductance required at that time;
   to determine an operating malfunction of the brake if the change in the inductance of the magnetic circuit of the brake remains after a brake control procedure at least for a defined period of time smaller than the minimum change in inductance required at that time; and
   to send to the control of the elevator information about a determined closing, opening and/or operating malfunction of the brake.

9. Elevator system according to claim 8, wherein the supervision of the movement of the magnetic circuit is fitted:
   to determine from the change in the inductance of the magnetic circuit the moment in time when the aforementioned two ferromagnetic parts start to move in relation to each other;
   to determine the magnitude of the thrusting force between the ferromagnetic parts of the brake from the current signal of the magnetizing coil, which current signal is determined at the time when the aforementioned two ferromagnetic parts start to move in relation to each other;
   to determine the operating condition of the brake on the basis of the thrusting force between the aforementioned ferromagnetic parts; and
   to send to the control of the elevator information about the operating condition of the brake determined on the basis of the thrusting force between the ferromagnetic parts.

10. Arrangement according to claim 2, wherein the supervision of the movement of the magnetic circuit is fitted:
   to supply an electrical alternating electricity excitation signal, in addition to a brake control signal, to the magnetizing coil;
   to determine the electrical alternating electricity response signal corresponding to the aforementioned electrical alternating electricity excitation signal; and
   to determine the inductance of the magnetic circuit of the brake from the aforementioned electrical alternating electricity excitation signal and electrical alternating electricity response signal.

11. Arrangement according to claim 2, wherein the supervision of the movement of the magnetic circuit is fitted:
   to determine from the change in the inductance of the magnetic circuit the moment in time when the aforementioned two ferromagnetic parts start to move in relation to each other;
   to determine the magnitude of the thrusting force between the ferromagnetic parts of the brake from the current signal of the magnetizing coil, which current signal is determined at the time when the aforementioned two ferromagnetic parts start to move in relation to each other; and
   to determine the operating condition of the brake on the basis of the thrusting force between the aforementioned ferromagnetic parts.

12. Arrangement according to claim 3, wherein the supervision of the movement of the magnetic circuit is fitted:
   to supply an electrical alternating electricity excitation signal, in addition to a brake control signal, to the magnetizing coil;
   to determine the electrical alternating electricity response signal corresponding to the aforementioned electrical alternating electricity excitation signal; and
   to determine the inductance of the magnetic circuit of the brake from the aforementioned electrical alternating electricity excitation signal and electrical alternating electricity response signal.

13. Arrangement according to claim 2, wherein the supervision of the movement of the magnetic circuit is fitted:
   to supply a voltage signal to the magnetizing coil, and also to determine the current signal caused in the magnetizing coil by the aforementioned voltage signal; and
   to determine the inductance of the magnetic circuit of the brake from the aforementioned voltage signal and aforementioned current signal.

14. Arrangement according to claim 3, wherein the supervision of the movement of the magnetic circuit is fitted:
   to supply an electrical alternating electricity excitation signal, in addition to a brake control signal, to the magnetizing coil;
   to determine the electrical alternating electricity response signal corresponding to the aforementioned electrical alternating electricity excitation signal; and
   to determine the inductance of the magnetic circuit of the brake from the aforementioned electrical alternating electricity excitation signal and electrical alternating electricity response signal.

15. Arrangement according to claim 4, wherein the supervision of the movement of the magnetic circuit is fitted:
   to determine from the change in the inductance of the magnetic circuit the moment in time when the aforementioned two ferromagnetic parts start to move in relation to each other;
   to determine the magnitude of the thrusting force between the ferromagnetic parts of the brake from the current signal of the magnetizing coil, which current signal is determined at the time when the aforementioned two ferromagnetic parts start to move in relation to each other; and to determine the operating condition of the brake on the basis of the thrusting force between the aforementioned ferromagnetic parts.

* * * * *